Nov. 7, 1967     J. F. MORSE     3,350,957

TRANSMISSION CONTROL LEVER MOUNT

Filed Jan. 28, 1966     3 Sheets-Sheet 2

INVENTOR.
JOHN F. MORSE
BY *Hamilton & Cook*
ATTORNEYS

United States Patent Office 3,350,957
Patented Nov. 7, 1967

3,350,957
TRANSMISSION CONTROL LEVER MOUNT
John F. Morse, Hudson, Ohio, assignor to Morse Controls Inc., Hudson, Ohio, a corporation of Ohio
Filed Jan. 28, 1966, Ser. No. 523,759
10 Claims. (Cl. 74—473)

The present invention relates generally to resilient bushing mounts. More particularly, the present invention relates to a resilient bushing mount for supporting transmission shift levers.

Power transmissions of the semi, or fully, automatic types used to provide a power train between the engine and the drive wheels of a vehicle are becoming increasingly more popular with such vehicles as the large over-the-road trucks and busses and the even larger off-the-road construction equipment. Such transmissions are adapted to provide a plurality of speed reduction ratios automatically in response to variations in certain operating parameters of the vehicle. Quite commonly, variations in the speed of the vehicle or the manifold pressure of the vehicle engine comprise these operating parameters.

Particularly for large vehicles it is desirable to allow the operator to select a limitation in the speed reduction range automatically obtainable in response to variations in the vehicle operating parameters. Such subjective determination permits consideration of external factors, such as roadway and traffic conditions.

A manually operated linkage, or control, assembly is generally provided to permit the operator to adapt the transmission to the various operating conditions. These control assemblies terminate with an operating, or control, lever located in the vehicle cab within easy access of the operator.

Such control levers have long been known to the art and many have been mounted on resilient bushings in order to insulate them from the vibrations of the vehicle. Additional biasing means have also been employed to urge the control levers into engagement with positioning stop means located to demark the various shift stations. However, to provide both the cushioning against vibration and the stop indicia, complex constructions have been required, and the complexity of the prior known constructions make them particularly susceptible to the accumulation of dirt and grit which readily abrades moving parts. Moreover, it has been found desirable to require the operator to apply differing forces to disengage the control lever from certain of the positioning stops as the lever is moved to other shift stations. Thus requiring different operating forces serves as a tactile signal to the operator and tends to prevent inadvertent shifting into the wrong range. Shifting into the wrong range, and particularly into a reverse range while the vehicle is moving forwardly, can destroy the transmission.

It is therefore a primary object of the present invention to provide a mounting for a transmission control lever which may be easily actuated by the operator and yet provide an assured tactile determination of the shift station toward which the control lever is being moved.

It is another object of the present invention to provide a control lever mount, as above, in which the tactile determination is signaled by positive stops at each station, and the operating force required to move the lever out of certain stations toward certain other stations is of differing magnitude sufficient itself to signal the operator.

It is still another object of the present invention to provide a control lever mount which incorporates a resilient bushing sufficient to insulate the control lever from the vibrations of the vehicle and which itself contributes to the provision of the above objects.

It is yet another object of the present invention to provide a control lever mount, as above, which permits the desired lateral pivoting of the control lever required to move between certain shift stations and at the same time tends to preclude undesirable torsional movement of the control lever.

It is a further object of the present invention to provide a control lever mount, as above, which incorporates as few moving parts as possible so that the mount is relatively uneffected by dirt, dust and other natural elements.

It is a still further object of the present invention to provide a control lever mount, as above, in which wear to the control lever mount does not result in rattle or backlash.

It is an even further object of the present invention to provide a control lever mount, as above, which is not only uncomplicated and inexpensive to manufacture, but is also sturdily built and positive in operation.

These and other objects of the invention, as well as the advantages thereof over existing and prior art forms, will be apparent in view of the following detailed description of the attached drawings and are accomplished by means hereinafter described and claimed.

One preferred embodiment of the present invention is shown by way of example in the accompanying drawings and hereinafter described in detail without attempting to show all of the various forms and modifications in which the invention might be embodied; the invention being measured by the appended claims and not by the details of the specification.

In general, a control lever mount embodying the concept of the present invention joins the control lever to its journal by a resilient bushing connected therebetween. The journal is located transversely through the hub portion of the control lever within an elongate slot in which the bushing is mounted. The major axis of the elongate slot is oriented parallel to the longitudinal axis of the control lever arm with the opposed side walls of the slot passing in close proximity to the journal. Contrarily, the opposed end walls are spaced outwardly of the journal a substantially greater distance than are the side walls.

Extending outwardly of the hub portion is a throw arm which is fastened to a motion transfer device, such as a push-pull cable, by a trunnion connector. The core of the push-pull cable is secured to the head portion of the trunnion connector, and the stem portion of the trunnion connector extends through, and is anchored rockably within, a double counter-sunk bore transversely of the throw arm.

Figure 1:
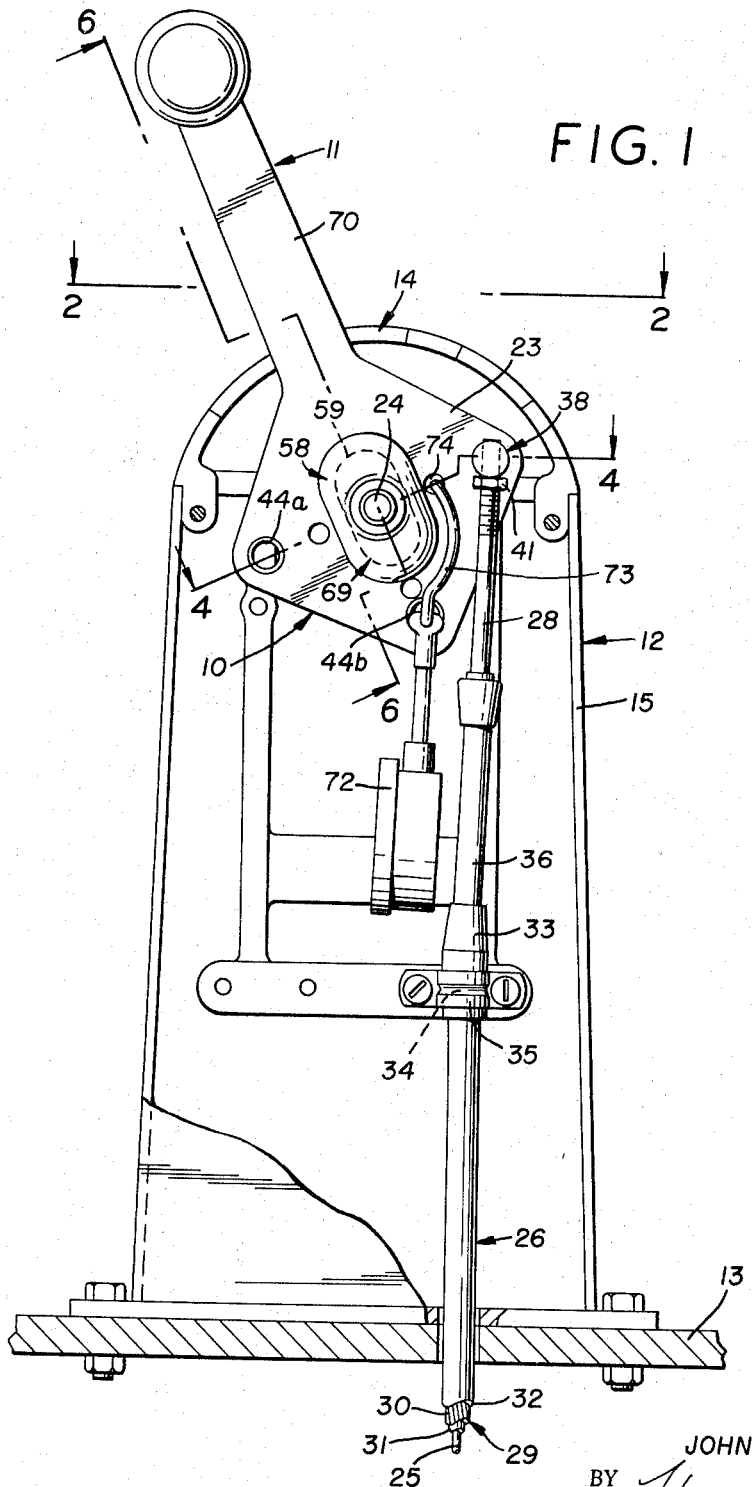
FIG. 1 is a longitudinal cross section of a control head in which a control lever is mounted according to the concept of the present invention.
Figure 2:
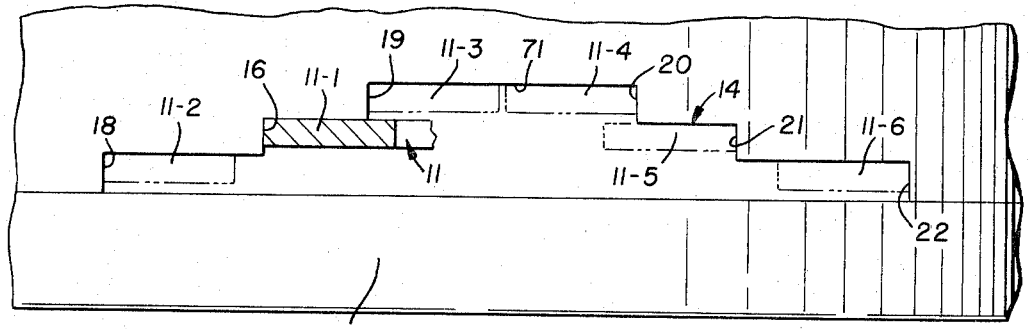
FIG. 2 is an enlarged top plan of the control head depicted in FIG. 1.

Referring more particularly to the drawings, the improved control lever mount, indicated generally by the numeral 10, is depicted, in FIG. 1, as carrying a control lever 11 in a control head assembly 12. The control head assembly 12 depicted is of the vertical, or columnar, type for mounting on the floorboard 13 of the vehicle. However, the control head may, with equal facility, be mounted to provide a horizontal presentation, as by mounting it on the dashboard. For convenience, the horizontal or vertical mounting would dictate the orientation of the slotted quadrant guide, or plate, 14 (FIG. 2). In the vertical head assembly depicted the quadrant guide 14 is formed integrally with the upper extremity of the longitudinally separable housing 15. If desired, it may just as well be separately fabricated and attached to the housing. For a horizontal housing it might be more convenient to form the quadrant more to the side of the housing so that it would face upwardly.

As best seen in FIG. 2, the quadrant plate presents six shift stations and is the type commonly used on trucks and busses for a "six speed automatic transmission." When the control lever 11 is in the position 11–1, against the position stop 16, the transmission is in neutral; in position 11–2, against position stop 18, the transmission is in reverse; in position 11–3, against position stop 19, the transmission will automatically shift from the low range, through two intermediate shift ranges, to the high speed, or sixth, gear; in position 11–4, against stop 20, the transmission will automatically shift from the low range, to the lower of the two intermediate ranges and into the higher of the intermediate ranges; in position 11–5, against stop 21, the transmission will automatically shift from the low range to the lower of the two intermediate ranges; and, in position 11–6, against stop 22, the transmission will automatically shift from a sub-creeper into a creeper range below the low range. The automatic shifting into successive ranges at any station is controlled by the operating parameters of the vehicle according to concepts well known to the prior art.

The movement of the control lever 11 between the various shift stations pivots the throw arm 23 connected thereto about their common mounting shaft 24 to translate the core 25 of a push-pull control cable 26, or other suitable motion transfer means. One end of the control cable core 25 is connected, by an end rod 28 depicted, to the throw arm 23, as more fully hereinafter described, and the opposite end is operatively attached to an automatic transmission, not shown.

The push-pull cable 26 may be of any conventional construction having a core 25 reciprocably slidable within a casing 29 to transmit mechanical motion by the application of either tensile or compressisve forces to the core 25. In the exemplary construction depicted, the casing is formed of a plurality of casing wires 30 laid contiguously, in the form of a long pitched helical coil, about the radially outer surface of an inner, flexible, plastic tube 31 which extends the full length of the casing 29. An outer cover 32 encases the coil of wires 30 up to within a short distance from the ends thereof.

A fitting 33 is positioned over the end of the cable casing 29 and is cold swaged, or otherwise suitably connected, onto the exposed portion of the cylindrical grouping of wires. A plurality of annular ribs, not shown, may be provided within the fitting 33 which, when crimped onto the cover 32, effect a seal between the end fitting 33 and the cover 32.

A retaining notch 34 is provided on the exterior of the fitting 33 for engagement by the screw mounted bracket 35 whereby the cable casing 29 is secured within the housing 15.

An extension tube 36 is swivelly mounted on the fitting 33, as by a socket arrangement not shown. The extension tube slidably receives the end rod 28 which is connected to the end of the core 25. The extension tube 36 is closely fitted around end rod 28 to guide the rod and to prevent excessive deflection of that portion of the core 25 sliding therein, when subjected to compressive loads.

Figure 4:
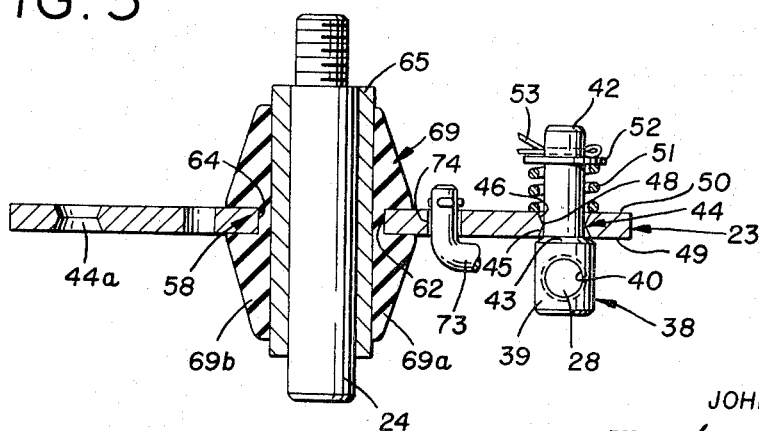
FIG. 4 is an enlarged bottom plan, partly in section, of the control lever and mount, taken substantially on line 4—4 of FIG. 1.
Figure 6:
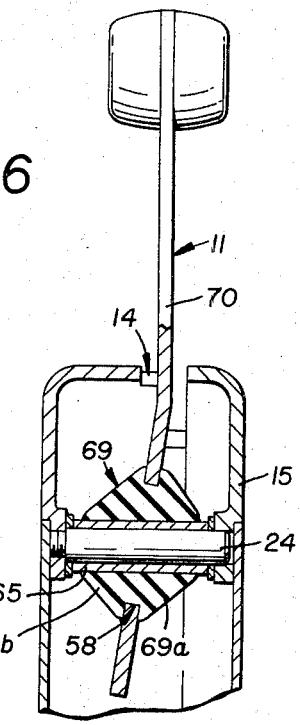
FIG. 6 is an enlarged cross section taken substantially on line 6—6 of FIG. 1.

The end rod 28 is connected to the throw arm 23 by a trunnion connector 38, as best seen in FIG. 4. The trunnion connector 38 has a head portion 39 transversely bored, at 40, to receive the end rod 28. As shown, the bore 40 may be threaded matingly to receive the correspondingly threaded end rod 28, and a lock nut 41 assures the connection.

An annular stem portion 42 extends coaxially outwardly of the head portion 39 and is conjoined therewith through a chamfered arris 43. The stem 42 is received in a bore 44 through throw arm 23 which has been double countersunk with the opposed chamfered cones 45 and 46 thereof meeting in a ridge 48 medially the opposed surfaces 49 and 50 of the throw arm 23. A spring 51 encircles the stem portion 42 of the trunnion connector 38 on the side of the throw arm 23 opposite the head portion 39 and is retained, or anchored, thereon by a washer 52 and cotter pin 53 to bias the chamfered arris 43 against the double countersunk bore 44. As is apparent from the drawings, the accommodation of the stem portion 42 within the double countersunk bore 44 and the juxtapositioning of the chamfered arris 43 against the throw arm 23 permits a limited lateral movement of the throw arm 23 without causing axial translation of the control cable core 25 and yet provides immediate axial translation of the cable core 25 upon rotation of the throw arm about the axis of the mounting shaft 24.

To assure engagement with the positioned stops at the various shift stations it is desirable that the control lever 11 be biased against the notched, or stepped, side of the quadrant plate or guide 14. This also requires that the operator overcome the biasing force applied to the control lever as he moves the control lever laterally out of engagement with one stop into a position where the control lever can be rotated into engagement with another positioning stop, as, for example, in moving the control lever from the position 11–4 to 11–5.

It has also been found highly advantageous to provide only a mild lateral biasing resistance to the control lever as it is moved from position 11–3 to the neutral position 11–1 and from the position 11–4 to 11–5. However, a considerably heavier biasing resistance is advantageous when moving the control lever 11 sufficiently laterally to permit it being rotated to positions 11–2 or 11–6. This differing magnitude of the biasing resistance together with the positioning stops afforded by the notched quadrant guide 14 determines a tactile signal to the operator as to the shift range into which the control lever is being moved without requiring a visual check.

Figure 3:
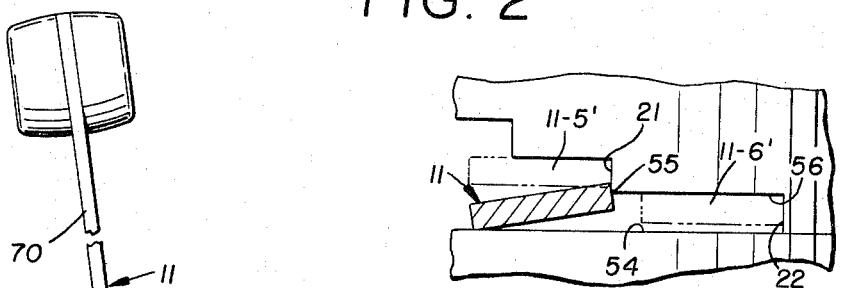
FIG. 3 is a fragmentary area of FIG. 2 depicting the control lever torsionally bound within the quadrant plate as it might be with prior art control lever mounts.

At the same time, any torsional movement of the control lever 11 must be effectively precluded. Referring to FIG. 3, when, for example, the control lever is moved from position 11–5′ to 11–6′ should the control lever tend to rotate about its own axis it would easily wedge between the back wall 54 of the quadrant guide 14 and the corner 55 defined by the intersection of positioning stop 21 and the forward wall 56 leading between the stops 21 and 22.

While increasing the distance between back wall 54 and the forward wall 56 could reduce the tendency to bind against the back wall 54 it would not reduce the tendency of the control lever to "hang up" on corner 55. Furthermore, merely increasing the dimension between back wall 54 and corner 55 would not alter the fact that an uncertain amount of lateral displacement would be required before the control lever could assuredly clear corner 55 and be rotated between shift stations. Such inherent "sloppiness" in the control is not only distracting to the operator, but could, particularly in emergencies, result in dangerous loss of control over the vehicle.

Figure 7:
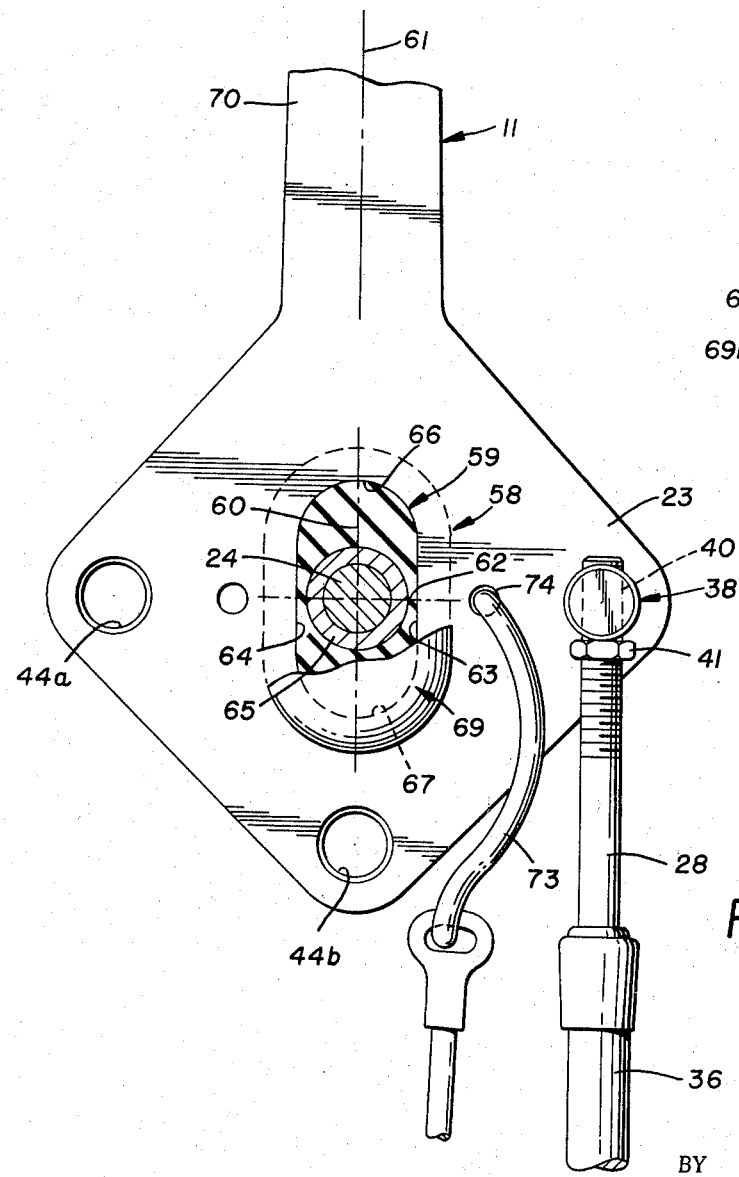
FIG. 7 is an enlarged area of FIG. 1.

In order to eliminate these disadvantages over the prior art, the control lever 11 is uniquely mounted on the shaft 24. Specifically, the hub portion 58 of the control lever has an elongate slot 59 oriented generally transversely of the rotational axis of the control lever 11 with the major axis 60 thereof paralleling, and preferably lying coincidentally, with the longitudinal axis 61 of the control lever 11. As best seen in FIGS. 1 and 7, the minor axis 62 is of considerably lesser magnitude than the major axis 60 so that the surfaces defining the elongate sides 63 and 64 of the elongate slot 59 pass in rather close proximity to the journal sleeve 65 rotatably received on the mounting shaft 24. Conversely, the surfaces defining the ends 66 and 67 of the elongate slots 59 are spaced considerably outwardly of the sleeve 65.

The journal sleeve 65 is secured to the hub portion 58 of the control lever by a resilient bushing 69. In the preferred form a high quality rubber is vulcanized onto the hub 58 and the sleeve 65 so that they are thereby permanently attached. While it is important that the resilient material forming the bushing 69 be joined through the elongate slot 59 to produce the desired results, the specific shape thereof is not critical. The opposed and conjoined, truncated pyramids 69a and 69b depicted, however, do provide exceptionally good results.

Figure 5:
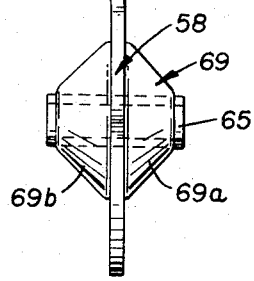
FIG. 5 is an enlarged side elevation of the control lever and resilient bushing on which it is mounted, as depicted in FIG. 1.

The arm portion 70 of the control lever 11 is elbowed slightly, as best seen in FIG. 5, so that when the sleeve 65 is journaled onto the shaft 24 the arm portion 70 of the control lever 11 is biased lightly against even the forwardmost wall 71 of the quadrant guide 14.

With the sleeve 65 thus secured to the hub portion 58, the control lever 11 is freely rotatable about the axis of the mounting shaft 24. Furthermore, with the major axis of the elongate slot 59 paralleling the longitudinal axis of the control lever 11, the control lever can be moved laterally about an arc coincident with the major axis 60 of the elongate slot 59 against the biasing resistance applied by the resilient bushing 69. This resistance is, depending upon the extent of the major axis, moderate as the control lever is moved from position 11–3 to 11–1 or from 11–4 to 11–5. However, this construction provides for a rapidly increasing spring rate, and hence much greater resistance, as the control lever is moved from position 11–1 to 11–2 or from 11–5 to 11–6.

By the same token, the relatively small dimension of clearance to the size of the sleeve 65 which results from the minimal minor axis of slot 59, provides an extremely high resistance to torsional movement of the control lever 11.

As can best be seen in FIG. 1, such a construction also permits the connection of the safety switch 72 thereto, as by link 73 passing through bore 74 and throw arm 23. A safety switch 72 is usually employed in conjunction with automatic transmissions so that the engine can be started only when the control 11 is in neutral—position 11–1 depicted in FIG. 2.

As shown, the throw arm 23 may comprise only one lobe of a rectangular plate, in order to permit alternative mounting locations for the trunnion connector 38 through double countersunk alternate bores 44a and 44b.

It should therefore be apparent that a control lever mounting embodying the concept of the present invention employs relatively few movable parts which are free from the deleterious action of dust and dirt and which nevertheless provide a cushion to prevent vehicular vibrations from being transmitted to the control lever and at the same time a varying resistance to lateral movement of the control lever which serves to afford a tactile determination of the shift station toward which the control lever is being moved.

What is claimed is:

1. A control lever mount comprising an arm extending through a slotted quadrant plate with a hub portion operably connected to a motion transfer means, opposed side walls and opposed end walls forming an elongate slot through said hub portion, a journal means received transversely of said slot, said side walls passing in close proximity to said journal means, said end walls spaced outwardly a greater distance from said journal means than are said side walls, and a resilient bushing between and secured to said journal means and said elongate slot.

2. A control lever mount, as set forth in claim 1, in which the major axis of said elongate slot parallels the longitudinal axis of the control lever arm.

3. A control lever mount, as set forth in claim 2, in which the quadrant plate has a plurality of notched positioning stops engageable by said control lever arm and between which said control lever arm can be moved by selective rotational and transverse movement about the minor axis of said elongate slot.

4. A control lever mount, as set forth in claim 3, in which the arm is elbowed to pre-stress the resilient bushing when said arm engages the laterally outermost stop.

5. A control lever mount, as set forth in claim 4, in which the journal means comprises a sleeve journaled on a mounting shaft extending transversely of the elongate slot.

6. A control lever mount, as set forth in claim 3, in which a throw arm extends outwardly of said hub portion and said motion transfer means is attached to the said throw arm by a trunnion connector having head and stem portions, said head portion secured to said motion transfer means, said stem portion being annular and extending through a double countersunk bore provided transversely of said throw arm.

7. A control lever mount, as set forth in claim 6, in which the double countersinking bore comprises opposed chamfered cones meeting in a ridge medially of the opposed surfaces of said throw arm.

8. A control lever, as set forth in claim 7, in which the stem and head portions of said trunnion connector are conjoined by a chamfered arris.

9. A control lever, as set forth in claim 8, in which a spring means biases said chamfered arris against said throw arm.

10. A control lever mount, as set forth in claim 9, in which the resilient bushing is formed in the shape of opposed, conjoined truncated pyramids.

References Cited

UNITED STATES PATENTS 2,775,134  12/1956  Swenson _____ 74—473
3,122,941  3/1964  Goldsmith _____ 74—473

MILTON KAUFMAN, *Primary Examiner.*